United States Patent
Jin et al.

(10) Patent No.: US 11,089,535 B2
(45) Date of Patent: Aug. 10, 2021

(54) HANDOVER METHOD IN MOBILE NETWORK AND COMMUNICATIONS APPARATUS

(71) Applicant: Huawei Technologies Co., Ltd., Shenzhen (CN)

(72) Inventors: Yinghao Jin, Shanghai (CN); Feng Han, Shanghai (CN); Hong Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 23 days.

(21) Appl. No.: 16/579,421

(22) Filed: Sep. 23, 2019

(65) Prior Publication Data

US 2020/0022061 A1 Jan. 16, 2020

Related U.S. Application Data

(63) Continuation of application No. PCT/CN2018/080076, filed on Mar. 22, 2018.

(30) Foreign Application Priority Data

Mar. 24, 2017 (CN) .......................... 201710184889.7

(51) Int. Cl.
*H04L 12/28* (2006.01)
*H04W 40/36* (2009.01)
(Continued)

(52) U.S. Cl.
CPC ....... *H04W 40/36* (2013.01); *H04W 28/0268* (2013.01); *H04W 36/0044* (2013.01);
(Continued)

(58) Field of Classification Search
CPC . H04W 36/0033; H04W 40/36; H04W 36/00; H04W 36/08
(Continued)

(56) References Cited

U.S. PATENT DOCUMENTS

2011/0002304 A1* 1/2011 Lee ...................... H04W 36/02
370/331
2015/0043382 A1 2/2015 Arora et al.
(Continued)

FOREIGN PATENT DOCUMENTS

| CN | 103650437 A | 3/2014 |
| CN | 106341832 A | 1/2017 |
| WO | 2017045644 A1 | 3/2017 |

OTHER PUBLICATIONS

3rd Generation Partnership Project; Technical Specification Group Radio Access Network; Study on New Radio Access Technology; Radio Access Architecture and Interfaces (Release 14), 3GPP TR 38.801 V2.0.0 (Mar. 2017), 90 pages.
(Continued)

*Primary Examiner* — John Pezzlo
(74) *Attorney, Agent, or Firm* — Slater Matsil, LLP

(57) ABSTRACT

This application provides a handover method in a mobile network and a communications apparatus. The method includes: sending, by a target access network node, a path switch request to a first core network node, where the first core network node is an access and mobility management function supported by both a source access network node and the target access network node, and the path switch request includes indication information of at least one semi-accepted flow/session/radio bearer; and receiving, by the target access network node, a path switch request reply sent by the first core network node, where the path switch request reply includes at least one of the following parameters: a flow/session/radio bearer whose path is successfully switched, a flow/session/radio bearer whose path fails to be switched, indication information of a new network slice, or a context of a modified flow/session/radio bearer.

18 Claims, 7 Drawing Sheets

(51) Int. Cl.
  *H04W 28/02* (2009.01)
  *H04W 36/00* (2009.01)
  *H04W 36/08* (2009.01)
  *H04W 40/12* (2009.01)
  *H04W 48/06* (2009.01)
  *H04J 1/16* (2006.01)

(52) U.S. Cl.
  CPC ........... *H04W 36/08* (2013.01); *H04W 40/12* (2013.01); *H04W 48/06* (2013.01)

(58) Field of Classification Search
  USPC ........................................ 370/252, 329, 331
  See application file for complete search history.

(56) References Cited

U.S. PATENT DOCUMENTS

| | | | | |
|---|---|---|---|---|
| 2016/0037406 | A1* | 2/2016 | Centonza | H04W 36/08 370/332 |
| 2017/0086118 | A1 | 3/2017 | Vrzic | |
| 2019/0239147 | A1* | 8/2019 | Chun | H04W 48/16 |
| 2019/0289528 | A1* | 9/2019 | Lou | H04L 41/0813 |
| 2019/0364495 | A1* | 11/2019 | Mildh | H04W 60/00 |

OTHER PUBLICATIONS

Zte, "Selection RAN Part Network Slice during UE mobility," 3GPP TSG RAN WG3 NR-adhoc, R3-170065, Spokane, WA, USA, Jan. 17-19, 2017, 8 pages.

LG Electronics, "Text proposal on mobility procedure considering network slice," 3GPP TSG-RAN WG3 Meeting #95, R3-170553, Athens, Greece, Feb. 13-17, 2017, 3 pages.

Ericsson, "Mobility and Mapping of NW slices," 3GPP TSG-RAN WG3 #95, R3-170677, Athens, Greece, Feb. 13-17, 2017, 3 pages.

China Mobile et al., "Network Slicing Architecture and High-Level Function Definition," SA WG2 Meeting #115, S2-162365, Nanjing, China, May 23-27, 2016, 7 pages.

* cited by examiner

# HANDOVER METHOD IN MOBILE NETWORK AND COMMUNICATIONS APPARATUS

CROSS-REFERENCE TO RELATED APPLICATIONS

This application is a continuation of International Application No. PCT/CN2018/080076, filed on Mar. 22, 2018, which claims priority to Chinese Patent Application No. 201710184889.7, filed on Mar. 24, 2017. The disclosures of the aforementioned applications are hereby incorporated by reference in their entireties.

TECHNICAL FIELD

This application relates to the field of wireless communications technologies, and in particular, to a handover method in a mobile network and a communications apparatus.

BACKGROUND

With the rapid development of wireless communications technologies, a 5th generation (5G) wireless communications technology has become a hotspot in the current industry. 5G supports diversified application requirements, including an access capability with higher-rate experience and higher bandwidth, information exchange with lower-latency and ultra-reliability, access and management of larger-scale and low-cost machine-type communications devices, and the like. In addition, 5G supports various application scenarios in vertical industries, such as the Internet of Vehicles, critical communications, and the Industrial Internet. Faced with the performance requirements and the application scenarios of 5G, a 5G network needs to better satisfy a specific user requirement, and a customization capability of the 5G network needs to be further improved.

In this case, an important concept of network slicing is introduced in 5G. A network slice is a combination of network functions (NFs) implementing a communication service and a network capability and corresponding resource requirements, and includes a core network (CN) part, a radio access network (RAN) part, and a terminal device part. A network slice forms an end-to-end logical network, so as to meet a performance requirement of one or more network services of a slice demand side. One RAN can support a plurality of network slices. For example, one RAN can support a plurality of vertical industry applications. Similarly, one terminal device can also support a plurality of network slices simultaneously, that is, support operation of services of the plurality of network slices simultaneously.

In a conventional cellular network, when a terminal device in a connected mode moves from a source base station to a target base station, a communication service of the terminal device needs to be handed over to the target base station. In the 5G network, functions of RAN devices from different equipment vendors may be different, or network slice deployment of an operator is region-specific, so that different RAN devices have different capabilities of supporting network slices. Therefore, services of network slices supported within coverage of the different RAN devices may also be different. For example, a network slice supported by one RAN device may be different from a network slice supported by another RAN device. When a terminal device moves, a network slice used for communication between the terminal device and a source base station may not be supported by a target base station. Currently, there is no appropriate solution to handing over a communications service of the terminal device in a mobile network supporting different network slices.

SUMMARY

This application describes a handover method in a mobile network and a communications apparatus to hand over a terminal device that moves in a mobile network having a deployment of different network slices.

According to a first aspect, an embodiment of this application provides a handover method in a mobile network, where the method includes: sending, by a source RAN node, a handover request to a target RAN node, where the handover request includes at least one of the following parameters: a context of at least one flow/session, a context of at least one radio bearer, network slice indication information of at least one network slice, or network slice remapping policy information; and receiving, by the source RAN node, a handover request reply sent by the target RAN node, where the handover request reply includes at least one of the following parameters: a configuration of at least one radio bearer accepted, modified, or newly established by the target RAN node, a mapping relationship between at least one flow/session and at least one radio bearer, or network slice indication information of at least one new network slice.

In a possible implementation, the network slice indication information of the at least one network slice is used to identify the at least one network slice used for communication between the terminal device and the source RAN node.

In a possible implementation, the network slice remapping policy information is used to indicate that at least one flow/session/radio bearer established for communication between the terminal device and the source RAN node or the at least one flow/session/radio bearer supported by the terminal device is remapped from the at least one network slice onto the at least one new network slice.

In a possible implementation, the network slice indication information of the at least one new network slice is used to identify the at least one new network slice onto which the at least one flow/session/radio bearer established for communication between the terminal device and the source RAN node is remapped.

In a possible implementation, the source RAN node sends a radio resource control RRC connection reconfiguration to the terminal device, and the RRC connection reconfiguration is used by the source RAN node to send, to the terminal device, the configuration of the at least one modified or newly established radio bearer and/or the mapping relationship between the at least one flow/session and the at least one radio bearer.

The source RAN node may send the network slice remapping policy information to the target RAN node, so that the target RAN node can further perform network slice remapping on a flow/session/radio bearer not supported by the target RAN node, thereby ensuring session continuity and improving performance experience for the terminal device.

According to a second aspect, an embodiment of this application provides a handover method in a mobile network, where the method includes: receiving, by a target RAN node, a handover request sent by a source RAN node, where the handover request includes at least one of the following parameters: a context of at least one flow/session, a context of at least one radio bearer, network slice indication information of at least one network slice, or network slice remapping policy information; performing, by the target RAN node, admission control, where the admission control is used to determine whether to accept at least one flow/session/radio bearer established for communication between the terminal device and the source RAN node, or determine whether to accept remapping of the at least one flow/session/radio bearer onto a network slice supported by the target RAN node; and sending, by the target RAN node, a handover request reply to the source RAN node, where the handover request reply includes at least one of the following parameters: a configuration of at least one radio bearer accepted, modified, or newly established by the target RAN node, a remapping relationship between at least one flow/session and at least one radio bearer, or network slice indication information of at least one new network slice.

In a possible implementation, the target RAN node sends a path switch request to a first CN node. The first CN node is an access and mobility management function supported by both the source RAN node and the target RAN node. The path switch request includes indication information of at least one semi-accepted flow/session/radio bearer. The target RAN node receives a path switch request reply sent by the first CN node. The path switch request reply includes at least one of the following parameters: at least one flow/session/radio bearer whose path is successfully switched, at least one flow/session/radio bearer whose path fails to be switched, the network slice indication information of the at least one new network slice, or a context of at least one modified flow/session/radio bearer.

In a possible implementation, the network slice indication information of the at least one network slice is used to identify the at least one network slice used for communication between the terminal device and the source RAN node.

In a possible implementation, the network slice remapping policy information is used to indicate that the at least one flow/session/radio bearer established for communication between the terminal device and the source RAN node or the at least one flow/session/radio bearer supported by the terminal device is remapped from the at least one network slice onto the at least one new network slice.

In a possible implementation, the network slice indication information of the at least one new network slice is used to identify the at least one new network slice onto which the at least one flow/session/radio bearer established for communication between the terminal device and the source RAN node is remapped.

In a possible implementation, the indication information of the at least one semi-accepted flow/session/radio bearer is used to indicate the at least one semi-accepted flow/session/radio bearer. The at least one semi-accepted flow/session/radio bearer means that QoS of the at least one flow/session/radio bearer established between the terminal device and the source RAN node may be supported by the target RAN node, but the target RAN node skips supporting a network slice to which the at least one semi-accepted flow/session/radio bearer belongs or skips determining whether to support a network slice to which the at least one semi-accepted flow/session/radio bearer belongs.

Because the target RAN node may perform the admission control based on the remapping policy information, the target RAN node may further perform network slice remapping on a flow/session/radio bearer not supported by the target RAN node, thereby ensuring session continuity and improving performance experience for the terminal device.

According to a third aspect, an embodiment of this application provides a handover method in a mobile network, where the method includes: receiving, by a first CN node, a path switch request sent by a target RAN node, where the first CN node is an access and mobility management function supported by both a source RAN node and the target RAN node, and the path switch request includes indication information of at least one semi-accepted flow/session/radio bearer; deciding, by the first CN node, on whether to remap the at least one semi-accepted flow/session/radio bearer onto a network slice; and sending, by the first CN node, a path switch request reply to the target RAN node, where the path switch request reply includes at least one of the following parameters: at least one flow/session/radio bearer whose path is successfully switched, at least one flow/session/radio bearer whose path fails to be switched, network slice indication information of at least one new network slice, or a context of at least one modified flow/session/radio bearer.

In a possible implementation, the indication information of the at least one semi-accepted flow/session/radio bearer is used to indicate the at least one semi-accepted flow/session/radio bearer. The at least one semi-accepted flow/session/radio bearer means that QoS of the at least one flow/session/radio bearer established between a terminal device and the source RAN node may be supported by the target RAN node, but the target RAN node skips supporting a network slice to which the at least one semi-accepted flow/session/radio bearer belongs or skips determining whether to support a network slice to which the at least one semi-accepted flow/session/radio bearer belongs.

In a possible implementation, the deciding, by the first CN node, on whether to remap the at least one semi-accepted flow/session/radio bearer onto a network slice includes deciding on whether to remap the at least one semi-accepted flow/session/radio bearer onto the at least one new network slice and a manner of mapping the at least one semi-accepted flow/session/radio bearer onto the at least one new network slice.

In a possible implementation, the indication information of the new network slice is used to identify the at least one new network slice onto which the at least one flow/session/radio bearer established for communication between the terminal device and the source RAN node is remapped.

Because the first CN node may decide based on remapping policy information, and perform network slice remapping on a flow/session/radio bearer not supported by the target RAN node, thereby ensuring session continuity and improving performance experience for the terminal device.

According to a fourth aspect, an embodiment of this application provides a handover method in a mobile network, where the method includes: receiving, by a terminal device, a radio resource control RRC connection reconfiguration sent by a source RAN node, where the RRC connection reconfiguration is used by the source RAN node to send, to the terminal device, a configuration of at least one modified or newly established radio bearer and/or a mapping relationship between at least one flow/session and at least one radio bearer; and performing, by the terminal device, a corresponding configuration based on the configuration of the at least one modified or newly established radio bearer and/or the mapping relationship between the at least one flow/session and the at least one radio bearer, and accessing a target RAN node.

According to a fifth aspect, a communications apparatus is provided, and the communications apparatus is configured to perform the method in the first aspect to the fourth aspect or any possible implementation in the first aspect to the fourth aspect. Specifically, the communications apparatus may include a unit configured to perform the method in the first aspect to the fourth aspect or any possible implementation in the first aspect to the fourth aspect.

According to a sixth aspect, a communications apparatus is provided, and the communications apparatus includes a memory and a processor. The memory is configured to store a computer program. The processor is configured to invoke the computer program from the memory and run the computer program, so that the communications device performs the method in the first aspect to the second aspect or any possible implementation in the first aspect to the fourth aspect.

According to a seventh aspect, a computer program product is provided, and the computer program product includes computer program code. When the computer program code is run by a communications unit, a processing unit, a transceiver, or a processor of a communications device (such as a network device or a network management device), the communications device performs the method in the first aspect to the fourth aspect or any possible implementation in the first aspect to the fourth aspect.

According to an eighth aspect, a computer-readable storage medium is provided. The computer-readable storage medium stores a program, and the program enables user equipment to perform the method in the first aspect to the fourth aspect or any possible implementation in the first aspect to the fourth aspect.

These aspects and other aspects of the present invention will be simpler and easier to understand in descriptions of the following (a plurality of) embodiments.

BRIEF DESCRIPTION OF THE DRAWINGS

The following briefly describes the accompanying drawings used to describe the embodiments of the present invention.

DETAILED DESCRIPTION OF ILLUSTRATIVE EMBODIMENTS

Figure 1:
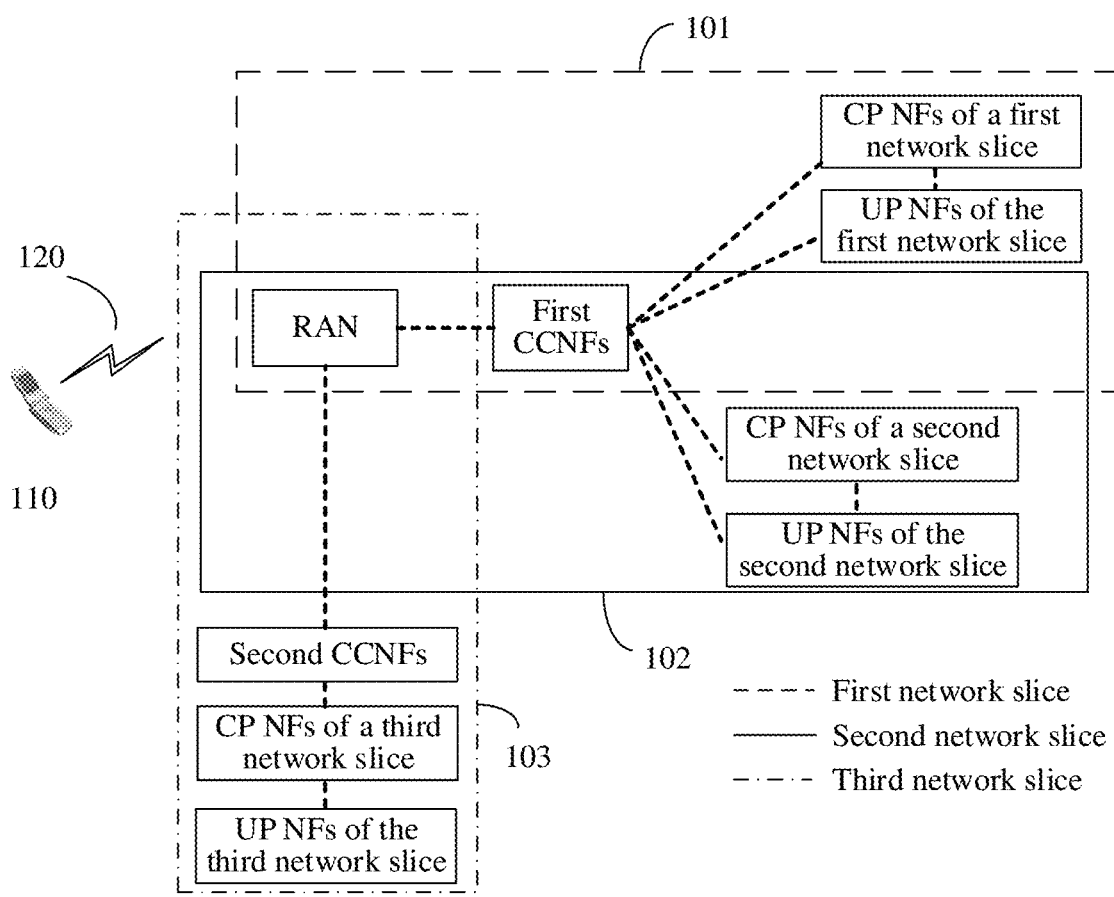
FIG. 1 shows a communications system according to an embodiment of the present invention.

The following describes technical solutions in embodiments of the present invention with reference to the accompanying drawings in the embodiments of this application.

In this application, the word "example" is used to represent giving an example, an illustration, or a description. Any embodiment described as "example" in this application should not be explained as being more preferred or having more advantages than another embodiment. To enable any person skilled in the art to implement and use the present invention, the following description is provided. Details are listed in the following description for explanation. It should be understood that a person of ordinary skill in the art may learn that this application can be implemented without using these specific details. In other embodiments, a well-known structure and a well-known process are not described in detail, to avoid obscure description of this application caused by unnecessary details. Therefore, this application is not limited to the shown embodiments, but is consistent with a maximum scope of a principle and features that are disclosed in this application.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

The terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A handover method in a mobile network and an apparatus provided in the embodiments of the present invention are applied to handover of a terminal device in the mobile network, and in particular to handover of a terminal device in a mobile network supporting different network slices. A network slice architecture includes a terminal device, a RAN, and a CN. Network functions (NFs) of a network slice in the CN include NFs of a control plane (CP) and NFs of a user plane (UP). CP NFs include functions of mobility management, session management, and the like, for example, access, tracking area update, and handover of a terminal device. UP NFs are used for data transmission of a terminal device. A RAN resource may be shared by all network slices in the CN, or may be exclusive to some network slices. Generally, one network can simultaneously support communication of a plurality of network slices. The network allocates a corresponding network resource to each network slice to ensure QoS of communication of each network slice. The terminal device implements a communication function by establishing connections to the RAN and the CN. In addition, one terminal device can simultaneously support communication of one or more network slices.

FIG. 1 shows a communications system 100 according to an embodiment of the present invention. A terminal device 110 communicates with a network device over a wireless link 120. The network device include a RAN device and a CN device, where the RAN device may be an access point (AP) in a WLAN or a base transceiver station (BTS) in a GSM or CDMA network, or may be a NodeB (NB) in a WCDMA network, or may be an evolved NodeB (eNB or eNodeB) in an LTE network, a relay station, an access point, an in-vehicle device, a wearable device, a RAN device in a future 5G network, or a RAN device in a future evolved PLMN, for example, may be a 5G gNB (for example, a next-generation NodeB (gNB) or next-generation radio (NR)), a transmission and reception point (TRP), a centralized unit (CU), or a distributed unit (DU). The CN device may be a mobility management entity (MME) or a gateway (gateway) in the LTE network, or may be a control plane (CP) network function (NF) or a user plane (UP) network function in a 5G network, for example, a common control plane network function (CCNF) or a session management network function (SMFt). In the CCNF, an access and mobility management function (AMF) is used to manage access of a terminal device to a mobile network and mobility of the terminal device in the mobile network. A RAN supports a plurality of network slices in a CN, such as a first network slice 101, a second network slice 102, and a third network slice 103. A plurality of network slices on a CP of the CN have both shared CP NFs and respective dedicated CP NFs. On an UP plane of the CN, each network slice has dedicated UP NFs. For example, the first network slice and the second network slice in FIG. 1 have both shared first CCNFs and respective dedicated CP NFs and UP NFs. The third network slice has shared second CCNFs and its dedicated CP NFs and UP NFs. It should be understood that the second CCNFs of the third network slice may be CP NFs shared by another network slice other than the first network slice and the second network slice.

In addition, in this embodiment of this application, the RAN device serves a cell. The terminal device communicates with the RAN device by using a transmission resource (for example, a frequency domain resource or a frequency spectrum resource) used by the cell. The cell may be a cell corresponding to the RAN device (for example, a base station). The cell may belong to a macro base station or a hyper cell, or may belong to a base station corresponding to a small cell. The small cell herein may include a metro cell, a micro cell, a pico cell, a femto cell, and the like. These small cells are characterized by a small coverage area and low transmit power, and are applied to providing a high-rate data transmission service.

The terminal device 110 may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device may be a station (STA) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a relay device, a computing device or another processing device connected to a wireless modem, an in-vehicle device, a wearable device, a terminal device in a next generation communications system such as a 5th generation (5G) communications network, a terminal device in a future evolved public land mobile network (PLMN), or the like.

By way of example but not limitation, in this embodiment of this application, the terminal device may alternatively be a wearable device. The wearable device may also be referred to as a wearable intelligent device, and is a generic term of wearable devices, such as glasses, gloves, a watch, clothing, and shoes, obtained by performing intelligent design and development on daily wear by using a wearable technology. A wearable device is a portable device directly worn on a body or integrated into clothes or an accessory of a user. The wearable device is not merely a hardware device, and further implements powerful functions through software support, data exchange, and cloud interaction. In a broad sense, wearable intelligent devices include a large-sized device, for example, a smartwatch or smart glasses, that provides comprehensive functions and that can implement all or some functions independent of a smartphone; and include a device, for example, various types of smart bands and smart jewelry used for vital sign monitoring, that is intended for only a specific type of application functions and that needs to be used together with another device such as a smartphone.

In a mobile network supporting different network slices, functions of RAN devices from different equipment vendors may be different, or network slice deployment of an operator is regional specific, so that different RAN devices have different capabilities of supporting network slices. Therefore, services of network slices supported within coverage of the different RAN devices may also be different. For example, a network slice supported by one RAN device may be different from a network slice supported by another RAN device. When the terminal device moves, a network slice used for communication between the terminal device and a source base station may not be supported by a target base station. Specifically, the target base station supports an AMF instead of another control plane function and/or user plane function of the network slice used for communication between the terminal device and the source base station. To be specific, the target base station skips supporting a dedicated network function of the network slice used for communication between the terminal device and the source base station.

Figure 2:
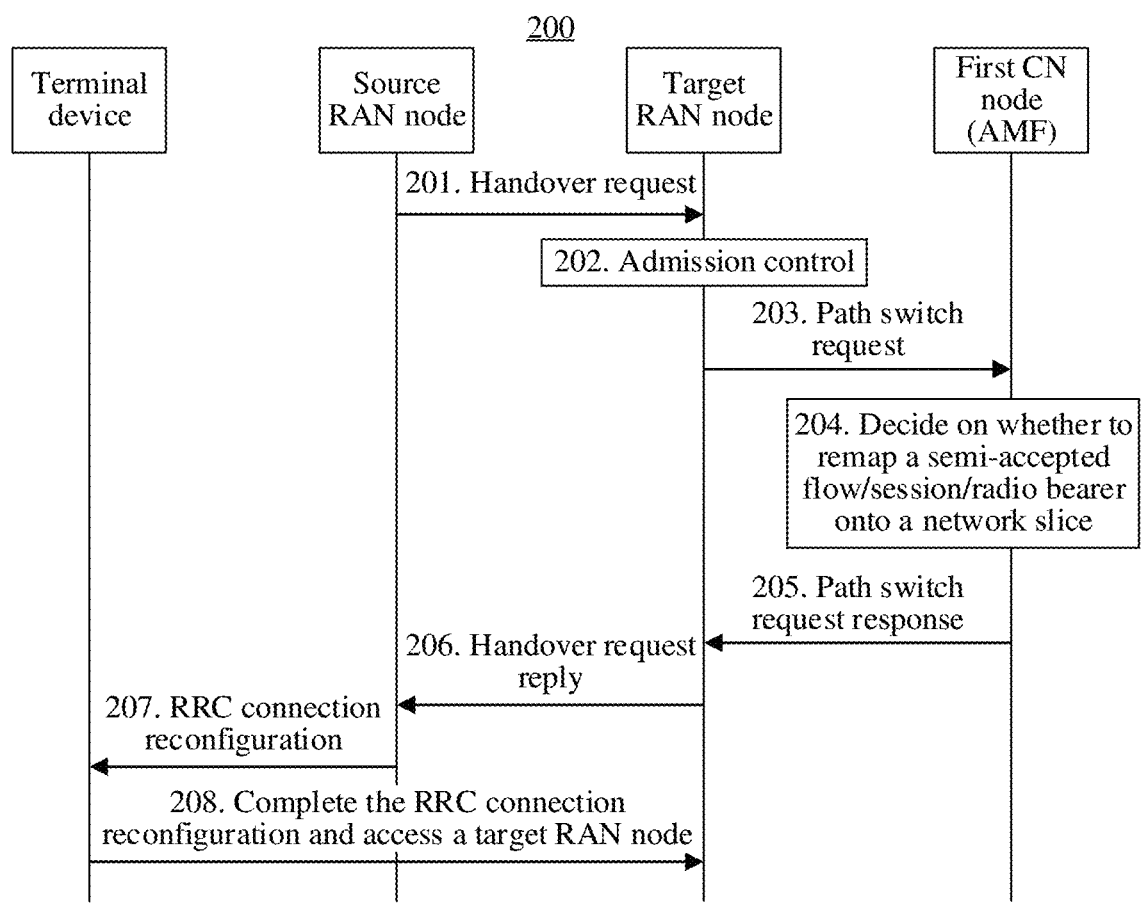
FIG. 2 is a schematic flowchart of a method for handing over a terminal device according to an embodiment of the present invention.
Figure 3:
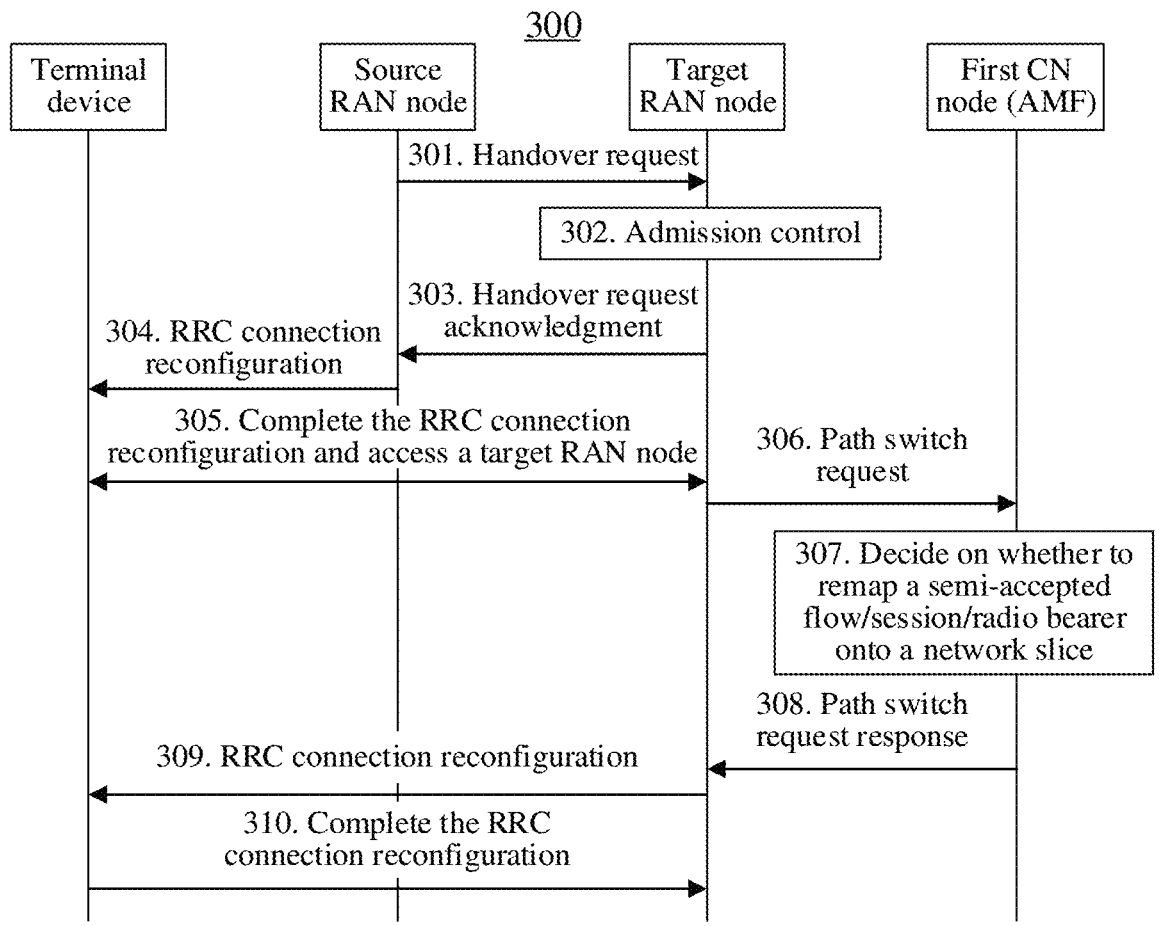
FIG. 3 is a schematic flowchart of a method for handing over another terminal device according to an embodiment of the present invention.

The following describes in detail a handover method in a mobile network according to an embodiment of this application with reference to FIG. 2 and FIG. 3. Specific embodiments are used below to describe in detail the technical solutions of this application. The following several specific embodiments may be combined with each other, and a same or similar concept or process may not be described repeatedly in some embodiments. It should be understood that FIG. 2 and FIG. 3 are schematic flowcharts of the handover method in the mobile network according to an embodiment of this application, and show detailed communication steps or operations of the method. However, these steps or operations are merely examples. Other operations or variations of various operations in FIG. 2 and FIG. 3 may be further performed in this embodiment of this application. In addition, all the steps in FIG. 2 and FIG. 3 may be separately performed in a sequence different from that presented in FIG. 2 and FIG. 3, and it is possible that not all the operations in FIG. 2 and FIG. 3 need to be performed.

FIG. 2 is a schematic flowchart of a method for handing over a terminal device according to an embodiment of the present invention. The method 200 is applicable to a scenario in which a target RAN node to which the terminal device is handed over skips supporting at least one dedicated network function of at least one network slice used for communication between the terminal device and a source RAN node or skips determining whether to support at least one dedicated network function of at least one network slice used for communication between the terminal device and a source RAN node, where the network slice used for communication between the terminal device and the source RAN node is at least one network slice to which a flow/session/radio bearer established between the terminal device and the source RAN node belongs. As shown in FIG. 2, the procedure includes the following steps.

201. The source RAN node sends a handover request to the target RAN node.

The source RAN node is a RAN node currently serving the terminal device. The target RAN node is a RAN node that is selected by the source RAN node from at least one neighboring RAN node and that is suitable for handover of the terminal device. The source RAN node and the target RAN node may be 5G gNBs, NRs, or other RAN devices, and are not limited in this embodiment of this application.

Further, the handover request includes at least one of the following parameters: a flow/session context, a radio bearer context, network slice indication information of at least one network slice, or network slice remapping (re-mapping) policy information. The network slice indication information is used to identify the network slice used for communication between the terminal device and the source RAN node.

Optionally, the flow/session context includes at least one of the following parameters: non-access stratum QoS information such as a UL and DL maximum flow bit rate, a priority level, a packet error rate, a latency (packet delay budget), or a QoS (quality of service) identifier.

Optionally, the radio bearer context includes at least one of the following parameters: access stratum QoS information, such as one or more of a QCI, a GBR, and the like.

Optionally, the network slice indication information may be represented by using at least one of the following parameters.

1. Network slice identifier:

1.1. Network slice type information. For example, the network slice type information may indicate a network slice type such as an enhanced mobile broadband (eMBB) service, ultra-reliable and low-latency communications (URLLC), or massive machine-type communications (mMTC). Optionally, the network slice type information may alternatively indicate an end-to-end network slice type including a RAN-CN network slice type, or may indicate a RAN side network slice type or a CN side network slice type.

1.2. Service type information related to a specific service. For example, the service type information may indicate a service feature such as a video service, an Internet of Vehicles service, or a voice service, or information about a specific service.

1.3. Tenant (tenant) information, used to indicate information about a client that creates or rents the network slice, such as Tencent or State Grid.

1.4. User group information, used to indicate group information of grouping users based on a feature such as a user level.

1.5. Slice group information, used to indicate that network slices can be grouped based on a feature or according to another criterion. For example, the feature means that all network slices that can be accessed by the terminal device may be used as a slice group.

1.6. Network slice instance information, used to indicate an identifier and feature information of an instance created for the network slice. For example, an identifier indicating a network slice instance may be assigned to the network slice instance, or a new identifier associated with the network slice instance may be mapped on a basis of a network slice instance identifier. A receiving side may identify, based on the identifier, a specific network slice instance indicated by the identifier.

1.7. Dedicated core network (DCN) identifier. The identifier is used to uniquely indicate a dedicated core network in an LTE system or an eLTE system, for example, a dedicated core network in the Internet of Things. Optionally, mapping may be performed on the DCN identifier and a network slice identifier. The DCN identifier may be mapped to the network slice identifier, and the network slice identifier may also be mapped to the DCN identifier.

2. Single network slice selection assistance information (S-NSSAI). The S-NSSAI includes at least slice/service type (SST) information. Optionally, the S-NSSAI may further include slice differentiator (SD) information. The SST information is used to indicate a behavior of a network slice, for example, a feature and a service type of the network slice. The SD information is complementary information of the SST. If the SST indicates implementation of a plurality of network slices, the SD may be corresponding to a unique network slice instance.

3. S-NSSAI group information, used to indicate grouping based on a feature, for example, all network slices of a common AMF that the terminal device can access are used as an S-NSSAI group.

4. Temporary identifier (temporary ID): Information about the temporary identifier is assigned by the AMF to a terminal already registered on a CN side, and the temporary ID may uniquely indicate an AMF.

It should be understood that, in this embodiment of this application, a network slice may use at least one of the foregoing parameters to represent network slice indication information corresponding to the network slice. For example, the network slice indication information corresponding to the network slice may be represented by the network slice type or the network slice type and the service type, or may be represented by the service type and the tenant information. This is not limited in this embodiment of this application. A manner of representing the network slice indication information corresponding to the network slice is not described in detail below. Optionally, a specific coding format of the network slice indication information is not limited. Different fields that may be carried in an interface message between different devices respectively represent different network slice indication information or may be replaced with abstracted index values, and different index values respectively correspond to different network slices.

Optionally, the network slice remapping policy information is used to indicate that at least one flow/session/radio bearer established for communication between the terminal device and the source RAN node or a flow/session/radio bearer supported by the terminal device is remapped from at least one original network slice onto at least one new network slice. The network slice remapping policy information may be a set of network slice indication information. For example, the current flow/session/radio bearer belongs to a first network slice, and the network slice remapping policy information indicates that the current flow/session/radio bearer can be remapped onto a second network slice, second and third network slices, or the like.

Optionally, the network slice indication information may be included in a flow/session/radio bearer context. The flow/session/radio bearer may be corresponding to a unique network slice by using the flow/session/radio bearer context; in other words, a specific network slice to which the flow/session/radio bearer belongs (a specific network slice on which the flow/session/radio bearer is established) may be learned from the flow/session/radio bearer context. The foregoing operation is also applied to a case in which a flow/session/radio bearer context and network slice indication information are both included in a subsequent message. Details are not described herein.

202. The target RAN node performs admission control.

In this step, the target RAN node performs the admission control on the terminal device based on a capability of the target RAN node for supporting a flow/session/radio bearer corresponding to the network slice used for communication between the terminal device and the source RAN node, a resource condition of the network slice, remapping policy information, and the like. In one case, the target RAN node skips supporting the at least one flow/session/radio bearer corresponding to the at least one network slice used for communication between the terminal device and the source RAN node, but has a capability for supporting a related network slice. In this case, the target RAN node may request, from a CN, that the target RAN node remaps, onto the network slice supported by the target RAN node, the at least one flow/session/radio bearer corresponding to the at least one network slice used for communication between the terminal device and the source RAN node. For example, the target RAN node determines, based on the network slice indication information received in step 201, that the target RAN node skips supporting the at least one network slice used for communication between the terminal device and the source RAN node, but determines, based on the radio bearer context received in step 201, current resource usage, and the like, that a QoS requirement of a flow/session/radio bearer established for current communication of the terminal device may be met. In this case, the target RAN node is considered to have the capability of supporting the network slice required by the flow/session/radio bearer established by the terminal device. In another possible case, the target RAN node skips determining whether to support the network slice used for communication between the terminal device and the source RAN node. In this case, the target RAN node may request, from a CN, that when the target RAN node skips supporting the at least one network slice used for communication between the terminal device and the source RAN node, the target RAN node remaps, onto the network slice supported by the target RAN node, the at least one flow/session/radio bearer of the at least one network slice used for communication between the terminal device and the source RAN node. For example, the target RAN node cannot determine, based on the network slice indication information received in step 201, whether the at least one network slice used for communication between the terminal device and the source RAN node is supported, but determines, based on the radio bearer context received in step 201, current resource usage, and the like, that a QoS requirement of a flow/session/radio bearer established for current communication of the terminal device may be met. In this case, the target RAN node is considered to have a capability for supporting a related network slice. In another possible case, the target RAN node skips supporting the at least one flow/session/radio bearer of the at least one network slice used for communication between the terminal device and the source RAN node, but the target RAN node can remap, based on the network slice remapping policy information received in step 201, the flow/session/radio bearer onto a network slice supported by the target RAN node. In this case, the target RAN node may request, from a CN, that the target RAN node remaps, onto the network slice selected and supported by the target RAN node, the at least one flow/session/radio bearer of the at least one network slice used for communication between the terminal device and the source RAN node.

203. The target RAN node sends a path switch request to a first CN node.

The first CN node is an AMF supported by both the source RAN node and the target RAN node, and the AMF is a common control plane function of the at least one network slice used for communication between the terminal device and the source RAN node.

Further, the path switch request includes indication information of at least one semi-accepted (semi-accept) flow/session/radio bearer. The semi-accepted flow/session/radio bearer means that QoS of a flow/session/radio bearer established between the terminal device and the source RAN node may be supported by the target RAN node, but the target RAN node skips supporting a network slice to which the semi-accepted flow/session/radio bearer belongs or skips determining whether to support a network slice to which the semi-accepted flow/session/radio bearer belongs. For example, the terminal device establishes a first flow/session/radio bearer, a second flow/session/radio bearer, and a third flow/session/radio bearer with the source RAN node, which are respectively corresponding to a first network slice, a second network slice, and a third network slice. In addition, the target RAN node skips supporting the first network slice, the second network slice, or the third network slice or skips determining whether to support the first network slice, the second network slice, and the third network slice. If the target RAN node can meet QoS requirements of all the first flow/session/radio bearer, the second flow/session/radio bearer, and the third flow/session/radio bearer, all the first flow/session/radio bearer, the second flow/session/radio bearer, and the third flow/session/radio bearer are semi-accepted flows/sessions/radio bearers. If the target RAN node can meet the QoS requirement of only the third flow/session/radio bearer, but cannot meet the QoS requirements of the first flow/session/radio bearer and the second flow/session/radio bearer, only the third flow/session/radio bearer is a semi-accepted flow/session/radio bearer. If the target RAN node can meet the QoS requirement of either the second flow/session/radio bearer or the third flow/session/radio bearer, but cannot meet the QoS requirements of both the second flow/session/radio bearer and the third flow/session/radio bearer, nor meet the QoS requirement of only the first flow/session/radio bearer, both the second flow/session/radio bearer and the third flow/session/radio bearer are semi-accepted flows/sessions/radio bearers, and the first flow/session/radio bearer is not a semi-accepted flow/session/radio bearer.

Optionally, the message includes network slice indication information of the at least one semi-accepted flow/session/radio bearer. The network slice indication information is used to indicate indication information of a network slice corresponding to the semi-accepted flow/session/radio bearer on the source RAN node, or indication information of a new network slice onto which an acceptable flow/session/radio bearer that needs to be remapped and that is determined based on both the indication information of the network slice corresponding to the semi-accepted flow/session/radio bearer on the source RAN node and the remapping policy information received in step 201.

Optionally, the message further includes a mapping relationship between the at least one semi-accepted flow/session/radio bearer and a radio bearer on the target RAN node, and a tunnel endpoint identifier of the semi-accepted flow/session/radio bearer on the target RAN node.

Optionally, the message further includes context information of the at least one semi-accepted flow/session/radio bearer.

204. The first CN node decides on whether to remap a semi-accepted flow/session/radio bearer onto a network slice.

In this step, the first CN node decides on whether to remap at least one semi-accepted flow/session/radio bearer onto a network slice. For example, the first CN node may determine, based on current CN load, user subscription information, and/or reserved information about the network slice supported by the target RAN node, whether to remap the semi-accepted flow/session/radio bearer onto a new network slice and a manner of mapping the semi-accepted flow/session/radio bearer onto the new network slice. If no information about the network slice corresponding to the semi-accepted flow/session/radio bearer in step 203 is received by the first CN node, the first CN node remaps, based on context information that is of the semi-accepted flow/session/radio bearer and that is reserved by the first CN node, and/or the reserved information about the network slice supported by the target RAN node, the semi-accepted flow/session/radio bearer onto the new network slice, or rejects the semi-accepted flow/session/radio bearer. It should be understood that if the first CN node receives the information about the network slice corresponding to the semi-accepted flow/session/radio bearer in step 203, the new network slice may be the same or different from the network slice indicated by the indication information of the network slice corresponding to the semi-accepted flow/session/radio bearer. For example, if the network slice indication information is the network slice indication information of the at least one network slice used for communication between the terminal device and the source RAN node, the remapping is implemented in the step, that is, the semi-accepted flow/session/radio bearer is remapped from its original network slice onto the new network slice, or the semi-accepted flow/session/radio bearer is rejected. If the network slice indication information is the indication information of the network slice onto which the semi-accepted flow/session/radio bearer determined and accepted by the target RAN node is remapped, the step may be used to perform one of the following three operations: checking that the new network slice determined by the target RAN node is appropriate and remapping the semi-accepted flow/session/radio bearer onto the new network slice; when confirming that the new network slice determined by the target RAN node is inappropriate, remapping the semi-accepted flow/session/radio bearer onto another appropriate network slice; and rejecting the semi-accepted flow/session/radio bearer.

205. The first CN node sends a path switch request reply to the target RAN node.

The path switch request reply includes at least one of the following parameters:

1. A flow/session/radio bearer whose path is successfully switched, for example, an identifier corresponding to at least one flow/session/radio bearer whose path is successfully switched.
2. A flow/session/radio bearer whose path fails to be switched, for example, an identifier corresponding to at least one flow/session/radio bearer whose path fails to be switched.
3. Indication information of a new network slice, that is, indication information of at least one new network slice onto which the at least one flow/session/radio bearer established for communication between the terminal device and the source RAN node is remapped, where the new network slice and the at least one network slice used for communication between the terminal device and the source RAN node have a common network function and/or dedicated network functions different from an AMF.
4. A context of a modified flow/session/radio bearer. For example, at least one flow/session/radio bearer corresponding to at least one network slice previously not supported by the target RAN node is deleted on a CN side, then at least one related flow/session/radio bearer is handed over to at least one network slice currently supported by the target RAN nod, and at least one flow/session/radio bearer is newly established on the at least one network slice currently supported by the target RAN node. In this case, the first CN node needs to notify the target RAN node of a context of the newly established at least one flow/session/radio bearer. In addition, the first CN node may further notify the target RAN node of a context of the deleted at least one flow/session/radio bearer corresponding to the at least one network slice.
5. Network slice support indication information. The information is used to indicate whether the target RAN node supports a network slice used for communication between the terminal device and the source RAN node.

The target RAN node modifies or establishes a new radio bearer and modifies or generates a mapping relationship between the flow/session/radio bearer and the radio bearer based on corresponding flow/session/radio bearer information and/or network slice indication information.

206. The target RAN node sends a handover request reply to the source RAN node.

In this step, the target RAN node sends, to the source RAN node, a configuration of the accepted, modified, or newly established radio bearer and/or the mapping relationship between the flow/session and the radio bearer.

Further, the target RAN node sends the indication information of the new network slice to the source RAN node.

Optionally, the target RAN node sends, to the source RAN node, flow/session profile information of a switched flow/session.

Optionally, the handover request reply further includes context information of at least one flow/session/radio bearer.

207. The source RAN node sends an radio resource control (RRC) connection reconfiguration to the terminal device.

In this step, the source RAN node performs RRC connection reconfiguration for the terminal device, and sends, to the terminal device, the configuration of the accepted, modified, or newly established radio bearer and/or the mapping relationship between the flow/session and the radio bearer.

Further, the source RAN node sends the indication information of the new network slice to the terminal device.

Optionally, the source RAN node sends, to the terminal device, flow/session profile information of a flow/session remapped onto a network slice.

Optionally, the RRC connection reconfiguration further includes context information of at least one semi-accepted flow/session/radio bearer.

208. The terminal device completes the RRC connection reconfiguration and accesses the target RAN node.

The terminal device performs a corresponding configuration based on the configuration of the modified or newly established radio bearer and/or the mapping relationship between the flow/session and the radio bearer that are sent by the source RAN node, accesses the target RAN node, and completes the RRC connection reconfiguration.

According to the foregoing steps, in a terminal device handover process, network slice remapping is performed on the flow/session/radio bearer that is corresponding to the network slice and that is not supported by the target RAN node, thereby ensuring session continuity and improving performance experience for the terminal device.

FIG. 3 is a schematic flowchart of a method 300 for handing over another terminal device according to an embodiment of the present invention. The method 300 is applicable to a scenario in which a target RAN node to which a terminal device is handed over skips supporting at least one network slice used for communication between the terminal device and a source RAN node or skips determining whether to support at least one network slice used for communication between the terminal device and a source RAN node, for example, a scenario in which the target RAN node to which the terminal device is handed over skips supporting at least one dedicated network function of the at least one network slice used for communication between the terminal device and the source RAN node or skips determining whether to support at least one dedicated network function of the at least one network slice used for communication between the terminal device and the source RAN node. The procedure includes the following steps.

301. The source RAN node sends a handover request to the target RAN node.

302. The target RAN node performs admission control.

Steps 301 and 302 are similar to the steps 201 and 202 in the foregoing embodiment, and details are not described herein.

303. The target RAN node sends a handover request reply to the source RAN node.

The handover request reply includes a flow/session/radio bearer context and/or indication information of a network slice corresponding to the flow/session/radio bearer. It should be understood that the flow/session/radio bearer context included in the handover request reply from the target RAN node is a context of a flow/session/radio bearer determined to be accepted by the target RAN node after the flow/session/radio bearer received in step 301 passes the admission control in step 302, and/or a context of a flow/session/radio bearer clearly acceptable after network slice remapping is performed.

304. The source RAN node sends an RRC connection reconfiguration to the terminal device.

In this step, the source RAN node performs the RRC connection reconfiguration for the terminal device, and sends the following information to the terminal device: the clearly acceptable flow/session/radio bearer, and/or a configuration of a radio bearer corresponding to the flow/session/radio bearer clearly acceptable on the target RAN node after the network slice remapping is performed, and/or a mapping relationship between a flow/session and a radio bearer.

Optionally, the RRC connection reconfiguration further includes indication information of a new network slice onto which an acceptable flow/session/radio bearer that needs to be remapped and that is determined by the target RAN node based on both the indication information of the network slice corresponding to a semi-accepted flow/session/radio bearer on the source RAN node and the remapping policy information received in step 201.

Optionally, the RRC connection reconfiguration further includes context information of at least one flow/session/radio bearer.

305. The terminal device completes the RRC connection reconfiguration and accesses the target RAN node.

The terminal device performs a corresponding configuration based on the following information sent by the target RAN node: the clearly acceptable flow/session/radio bearer, and/or the configuration of the radio bearer that is on the target RAN node and that is corresponding to the flow/session/radio bearer clearly acceptable after the network slice remapping is performed, and/or the mapping relationship between the flow/session and the radio bearer, and accesses the target RAN node.

306. The target RAN node sends a path switch request to a first CN node.

307. The first CN node decides on whether to remap a semi-accepted flow/session/radio bearer onto a network slice.

308. The first CN node sends a path switch request reply to the target RAN node.

Steps 306 to 308 are similar to the steps 203 to 205 in the foregoing step, and details are not described herein.

309. The target RAN node sends an RRC connection reconfiguration to the terminal device.

In this step, the target RAN node sends, to the terminal device, a configuration of a modified or newly established radio bearer and/or the mapping relationship between the flow/session and the radio bearer.

Further, the target RAN node sends the indication information of the new network slice to the terminal device.

Optionally, the target RAN node sends, to the terminal device, flow/session profile information of a flow/session remapped onto a network slice.

Optionally, the RRC connection reconfiguration further includes context information of at least one semi-accepted flow/session/radio bearer.

310. The terminal device sends RRC connection reconfiguration complete information.

According to the foregoing steps, the RRC connection reconfiguration may be first performed for the terminal device on the source RAN node, and then the network slice remapping of the flow/session/radio bearer is performed. In addition, an RRC connection of the terminal device is reconfigured based on a remapping result, so as to satisfy service continuity.

It should be understood that in this specification, various types of identifiers such as network slice identifiers, flow/session/radio bearer identifiers, and tunnel endpoint identifiers may be in a plurality of forms, for example, may be in a numeric form, or may be in a character form, or may be in a form of a combination of numeric and character. This is not limited in the embodiments of this application.

It should be understood that in this specification, information exchanging between different devices can be carried on any message, for example, the RRC connection reconfiguration and a handover command between the terminal device and the source RAN node, the path switch request and the path switch request reply between the target RAN node and the first CN node, and the handover request and a handover request acknowledgment between the source RAN node and the target RAN node. The information exchanging can be carried on a message of any name. This is not limited in this embodiment of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like. A person skilled in the art may use different methods to implement the described functions for each particular application, but it should not be considered that the implementation goes beyond the scope of this application.

The foregoing describes in detail the method embodiments of this application with reference to FIG. 2 to FIG. 3. The following describes in detail apparatus embodiments of this application with reference to FIG. 4 to FIG. 11. It should be understood that the apparatus embodiments and the method embodiments are corresponding to each other. For similar descriptions, refer to the method embodiments. It should be noted that the apparatus embodiments may be used together with the methods, or may be independently used.

Figure 4:
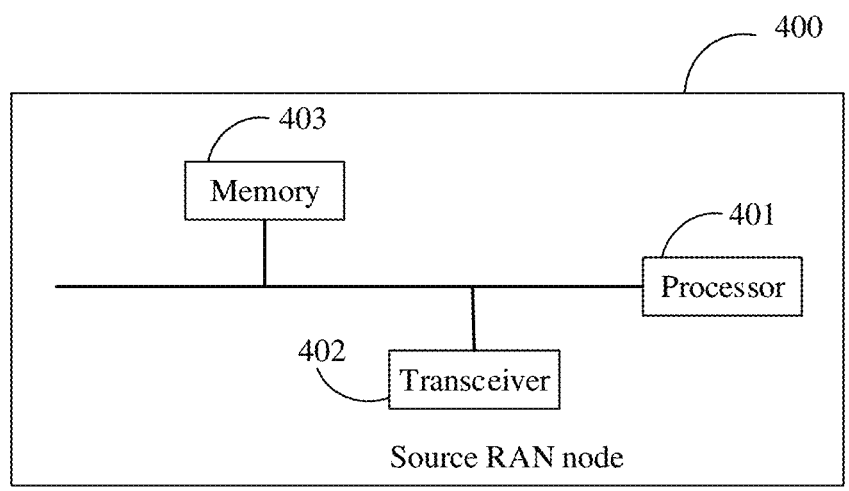
FIG. 4 is a schematic block diagram of a network device according to an embodiment of this application.

FIG. 4 is a schematic block diagram of a communications apparatus 400 according to an embodiment of this application. The communications apparatus 400 may be corresponding to (for example, may be configured on or may be) the source RAN node described in the foregoing method 200 or the source RAN node described in the foregoing method 300. The communications apparatus 400 may include a processor 401 and a transceiver 402, and the processor 401 and the transceiver 402 have a communication connection. Optionally, the communications apparatus 400 further includes a memory 403, and the memory 403 and the processor 401 have a communication connection. Optionally, the processor 401, the memory 403, and the transceiver 402 may have communication connections. The memory 403 may be configured to store an instruction. The processor 401 is configured to execute the instruction stored in the memory 403, to control the transceiver 402 to send information or a signal. The processor 401 and the transceiver 402 are respectively configured to perform each action or processing process performed by the source RAN node in the method 200 or the source RAN node in the method 300. To avoid repetition, detailed descriptions thereof are omitted herein.

Figure 5:
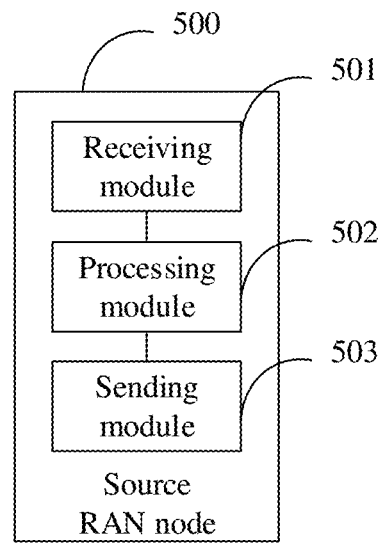
FIG. 5 is a schematic block diagram of another network device according to an embodiment of this application.

FIG. 5 is a schematic block diagram of a communications apparatus 500 according to an embodiment of this application. The communications apparatus 500 may be corresponding to (for example, may be configured on or may be) the source RAN node described in the foregoing method 200 or the source RAN node described in the foregoing method 300. The communications apparatus 500 may include a receiving module 501, a processing module 502, and a sending module 503. The processing module 502 is separately connected to the receiving module 501 and the sending module 503. Modules or units in the communications device 500 are respectively configured to perform each action or processing process performed by the source RAN node in the method 200 or the source RAN node in the method 300. To avoid repetition, detailed descriptions thereof are omitted herein.

Figure 6:
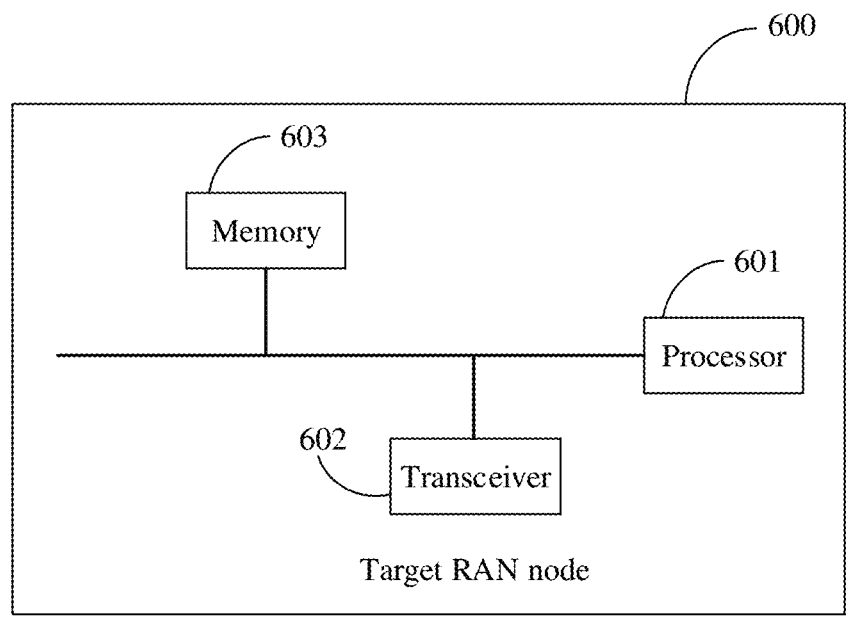
FIG. 6 is a schematic block diagram of still another network device according to an embodiment of this application.

FIG. 6 is a schematic block diagram of a communications apparatus 600 according to an embodiment of this application. The communications apparatus 600 may be corresponding to (for example, may be configured on or may be) the target RAN node described in the foregoing method 200 or the target RAN node described in the foregoing method 300. The communications apparatus 600 may include a processor 601 and a transceiver 602, and the processor 601 and the transceiver 602 have a communication connection. Optionally, the communications apparatus 600 further includes a memory 603, and the memory 603 and the processor 601 have a communication connection. Optionally, the processor 601, the memory 603, and the transceiver 602 may have communication connections. The memory 603 may be configured to store an instruction. The processor 601 is configured to execute the instruction stored in the memory 603, to control the transceiver 602 to send information or a signal. The processor 601 and the transceiver 602 are respectively configured to perform each action or processing process performed by the target RAN node in the method 200 or the target RAN node in the method 300. To avoid repetition, detailed descriptions thereof are omitted herein.

Figure 7:
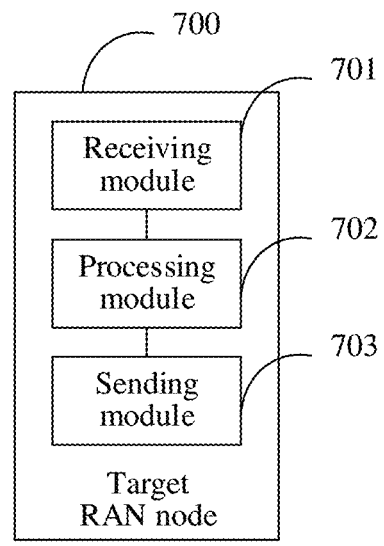
FIG. 7 is a schematic block diagram of still another network device according to an embodiment of this application.

FIG. 7 is a schematic block diagram of a communications apparatus 700 according to an embodiment of this application. The communications apparatus 700 may be corresponding to (for example, may be configured on or may be) the target RAN node described in the foregoing method 200 or the target RAN node described in the foregoing method 300. The communications apparatus 700 may include a receiving module 701, a processing module 702, and a sending module 703. The processing module 702 is separately connected to the receiving module 701 and the sending module 703. Modules or units in the communications device 700 are respectively configured to perform each action or processing process performed by the target RAN node in the method 200 or the target RAN node in the method 300. To avoid repetition, detailed descriptions thereof are omitted herein.

Figure 8:
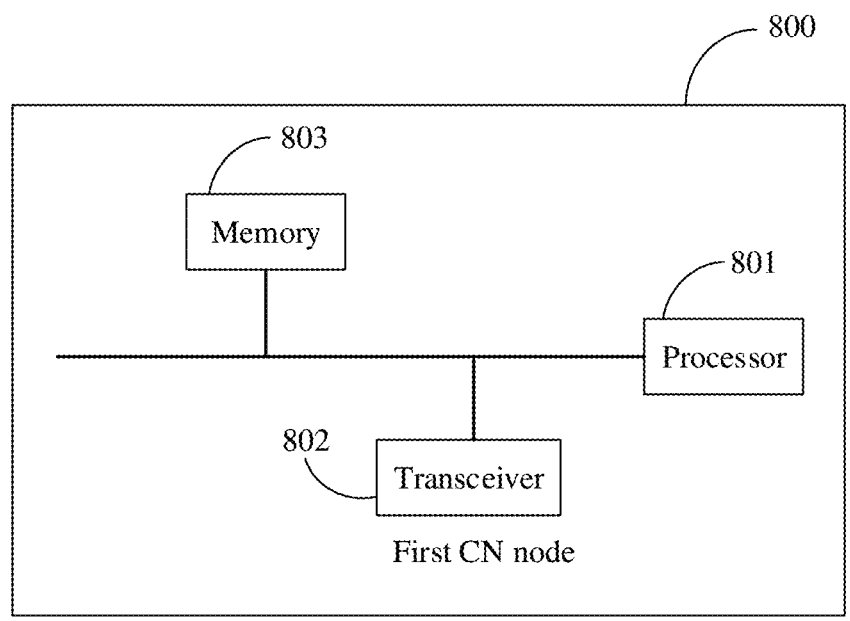
FIG. 8 is a schematic block diagram of still another network device according to an embodiment of this application.

FIG. 8 is a schematic block diagram of a communications apparatus 800 according to an embodiment of this application. The communications apparatus 800 may be corresponding to (for example, may be configured on or may be) the first CN node (or also referred to as an AMF node) described in the foregoing method 200 or the AMF node described in the foregoing method 300. The communications apparatus 800 may include a processor 801 and a transceiver 802, and the processor 801 and the transceiver 802 have a communication connection. Optionally, the communications apparatus 800 further includes a memory 803, and the memory 803 and the processor 801 have a communication connection. Optionally, the processor 801, the memory 803, and the transceiver 802 may have communication connections. The memory 803 may be configured to store an instruction. The processor 801 is configured to execute the instruction stored in the memory 803, to control the transceiver 802 to send information or a signal. The processor 801 and the transceiver 802 are respectively configured to perform each action or processing process performed by the first CN node (or also referred to as the AMF node) in the method 200 or the AMF node in the method 300. To avoid repetition, detailed descriptions thereof are omitted herein.

Figure 9:
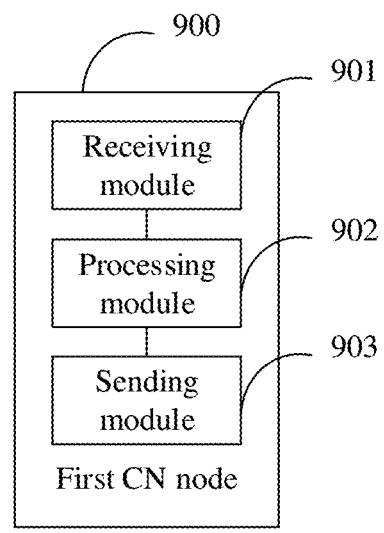
FIG. 9 is a schematic block diagram of still another network device according to an embodiment of this application.

FIG. 9 is a schematic block diagram of a communications apparatus 900 according to an embodiment of this application. The communications apparatus 900 may be corresponding to (for example, may be configured on or may be) the first CN node (or also referred to as an AMF node) described in the foregoing method 200 or the AMF node described in the foregoing method 300. The communications apparatus 900 may include a receiving module 901, a processing module 902, and a sending module 903. The processing module 902 is separately connected to the receiving module 901 and the sending module 903. Modules or units in the communications device 900 are respectively configured to perform each action or processing process performed by the first CN node (or also referred to as the AMF node) in the method 200 or the AMF node in the method 300. To avoid repetition, detailed descriptions thereof are omitted herein.

Figure 10:
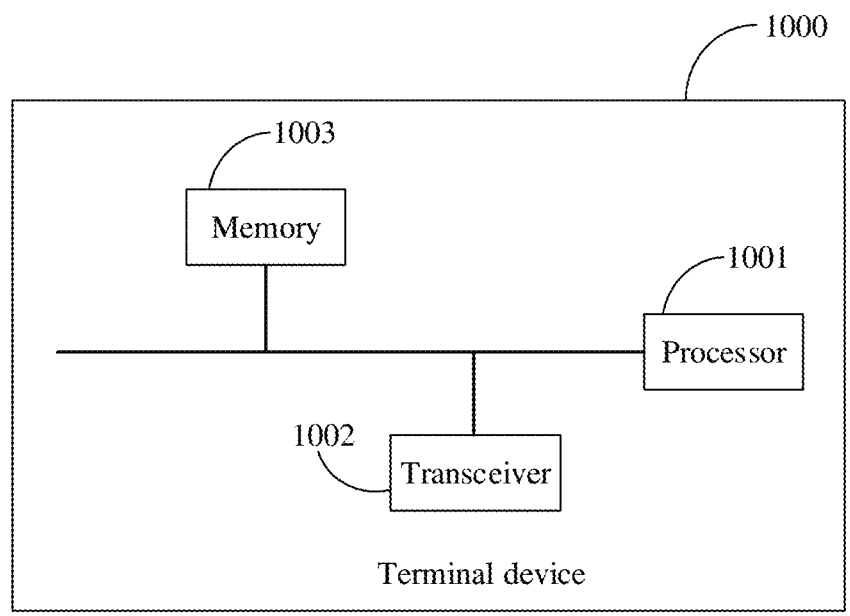
FIG. 10 is a schematic block diagram of a terminal device according to an embodiment of this application.

FIG. 10 is a schematic block diagram of a communications apparatus 1000 according to an embodiment of this application. The communications apparatus 1000 may be corresponding to (for example, may be configured on or may be) the terminal device described in the foregoing method 200 or the terminal device described in the foregoing method 300. The communications apparatus 1000 may include a processor 1001 and a transceiver 1002, and the processor 1001 and the transceiver 1002 have a communication connection. Optionally, the communications apparatus 1000 further includes a memory 1003, and the memory 1003 and the processor 1001 have a communication connection. Optionally, the processor 1001, the memory 1003, and the transceiver 1002 may have communication connections. The memory 1003 may be configured to store an instruction. The processor 1001 is configured to execute the instruction stored in the memory 1003, to control the transceiver 1002 to send information or a signal. The processor 1001 and the transceiver 1002 are respectively configured to perform each action or processing process performed by the terminal device in the method 200 or the terminal device in the method 300. To avoid repetition, detailed descriptions thereof are omitted herein.

Figure 11:
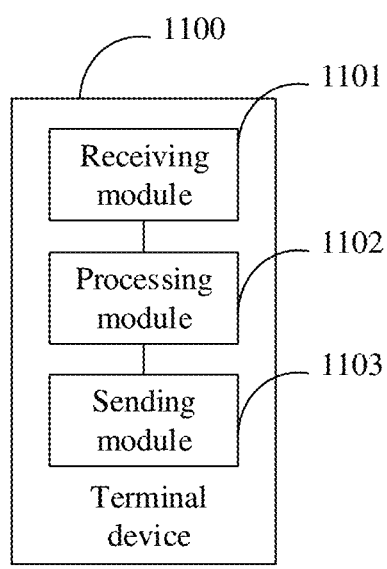
FIG. 11 is another schematic block diagram of a terminal device according to an embodiment of this application.

FIG. 11 is a schematic block diagram of a communications apparatus 1100 according to an embodiment of this application. The communications apparatus 1100 may be corresponding to (for example, may be configured on or may be) the terminal device described in the foregoing method 200 or the terminal device described in the foregoing method 300. The communications apparatus 1100 may include a receiving module 1101, a processing module 1102, and a sending module 1103. The processing module 1102 is separately connected to the receiving module 1101 and the sending module 1103. Modules or units in the communications device 1100 are respectively configured to perform each action or processing process performed by the terminal device in the method 200 or the terminal device in the method 300. To avoid repetition, detailed descriptions thereof are omitted herein.

It should be understood that the processor (401, 601, 801, 1001) in the embodiments of this application may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory (403, 603, 803, or 1003) in the embodiments of this application may be a volatile memory, for example a random access memory (RAM); or may be a nonvolatile memory, for example, a read-only memory (ROM), a flash memory, a hard disk drive (HDD), or a solid state drive (SSD); or may be a combination of the foregoing types of memories.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    receiving, by a target access network node of a mobile network, a handover request sent by a source access network node, wherein the handover request comprises: a context of a flow, a context of a session, a context of a first radio bearer, network slice indication information of a first network slice, or network slice remapping policy information;

performing admission control by the target access network node, wherein the admission control is used to:
    determine whether to accept the flow, the session, or the first radio bearer, wherein the flow, the session, or the first radio bearer is established for communication between a terminal device and the source access network node; or
    determine whether to accept remapping of the flow, the session, or the first radio bearer onto the first network slice which is supported by the target access network node; and sending, by the target access network node, a handover request reply to the source access network node, wherein the handover request reply comprises:
    a configuration of the first radio bearer that has been accepted or modified by the target access network node;
    a configuration of a second radio bearer newly established by the target access network node;
    a mapping relationship between the flow and the first radio bearer;
    a mapping relationship between the flow and the second radio bearer;
    a mapping relationship between the session and the first radio bearer;
    a mapping relationship between the session and the second radio bearer;
    a mapping relationship between the flow and network slice indication information of a second network slice, and the second network slice is a new network slice; or
    a mapping relationship between the session and the network slice indication information of the second network slice, and the second network slice is a new network slice.

2. The method according to claim 1, further comprising:
sending, by the target access network node, a path switch request to a first core network node, wherein the first core network node is an access and mobility management function supported by both the source access network node and the target access network node, and the path switch request comprises indication information of a semi-accepted flow, indication information of a semi-accepted session, or indication information of a semi-accepted radio bearer; and
receiving, by the target access network node, a path switch request reply sent by the first core network node, wherein the path switch request reply comprises:
    the semi-accepted flow whose path is successfully switched;
    the semi-accepted session whose path is successfully switched;
    the semi-accepted radio bearer whose path is successfully switched;
    the semi-accepted flow whose path has failed to be switched;
    the semi-accepted session whose path has failed to be switched;
    the semi-accepted radio bearer whose path has failed to be switched;
    the network slice indication information of the second network slice;
    a context of the semi-accepted flow which has been modified;
    a context of the semi-accepted session which has been modified; or
    a context of the semi-accepted radio bearer which has been modified.

3. The method according to claim 2, wherein:
the indication information of the semi-accepted flow, the indication information of the semi-accepted session, or the indication information of the semi-accepted radio bearer indicates the semi-accepted flow, the semi-accepted session or the semi-accepted radio bearer; and
the flow is the semi-accepted flow, the session is the semi-accepted session, or the first radio bearer is the semi-accepted radio bearer when quality of service (QoS) of the flow, the session, or the first radio bearer established between the terminal device and the source access network node is supported by the target access network node, but the target access network node skips supporting a network slice to which the flow, the session, or the first radio bearer belongs, or skips determining whether to support a network slice to which the flow, the session, or the first radio bearer belongs.

4. The method according to claim 1, wherein the network slice remapping policy information indicates:
    the flow, the session, or the first radio bearer established for communication between the terminal device and the source access network node is remapped from the first network slice onto the second network slice; or
    the flow, the session, or the first radio bearer is supported by the terminal device and is remapped from the first network slice onto the second network slice.

5. The method according to claim 1, wherein the network slice indication information of the second network slice identifies the second network slice onto which the flow, the session, or the first radio bearer established for communication between the terminal device and the source access network node is remapped.

6. A method, comprising:
receiving, by a first core network node, a path switch request sent by a target access network node, wherein the first core network node is an access and mobility management function supported by both a source access network node and the target access network node, and the path switch request comprises indication information of a semi-accepted flow, indication information of a semi-accepted session, or indication information of a semi-accepted radio bearer;
deciding, by the first core network node, whether to remap the semi-accepted flow, the semi-accepted session, or the semi-accepted radio bearer onto a network slice; and
sending, by the first core network node, a path switch request reply to the target access network node, wherein the path switch request reply comprises:
    the semi-accepted flow whose path is successfully switched;
    the semi-accepted session whose path is successfully switched;
    the semi-accepted radio bearer whose path is successfully switched;
    the semi-accepted session whose path fails to be switched;
    the semi-accepted radio bearer whose path fails to be switched;
    the semi-accepted flow whose path fails to be switched;

network slice indication information of the network slice, wherein the network slice is a new network slice;
a context of a modified flow;
a context of a modified session; or
a context of a modified radio bearer.

7. The method according to claim 6, wherein:
the indication information of the semi-accepted flow, the indication information of the semi-accepted session, or the indication information of the semi-accepted radio bearer indicates the semi-accepted flow, the semi-accepted session, or the semi-accepted radio bearer; and
a flow is the semi-accepted flow, a session is the semi-accepted session, or a radio bearer is the semi-accepted radio bearer when quality of service (QoS) of the flow, the session, or the radio bearer that is established between a terminal device and the source access network node is supported by the target access network node, but the target access network node skips supporting the network slice to which the semi-accepted flow, the semi-accepted session, or the semi-accepted radio bearer belongs, or skips determining whether to support the network slice to which the semi-accepted flow, the semi-accepted session, or the semi-accepted radio bearer belongs.

8. The method according to claim 6, wherein deciding, by the first core network node, whether to remap the semi-accepted flow, the semi-accepted session, or the semi-accepted radio bearer onto the network slice comprises deciding on whether to remap the semi-accepted flow, the semi-accepted session, or the semi-accepted radio bearer onto the network slice, and a manner of mapping the semi-accepted flow, the semi-accepted session, or the semi-accepted radio bearer onto the network slice.

9. The method according to claim 6, wherein the indication information of the network slice identifies the network slice onto which the semi-accepted flow, the semi-accepted session, or the semi-accepted radio bearer is remapped, wherein the semi-accepted flow, the semi-accepted session, or the semi-accepted radio bearer is established for communication between a terminal device and the source access network node.

10. An apparatus, comprising:
a processor;
a receiver, configured to receive a handover request sent by a source access network node, wherein the handover request comprises: a context of a flow, a context of a session, a context of a first radio bearer, network slice indication information of a first network slice, or network slice remapping policy information;
a non-transitory computer-readable storage medium storing a program to be executed by the processor, the program including instructions to:
perform admission control, wherein the admission control is used to:
determine whether to accept the flow, the session, or the first radio bearer, wherein the flow, the session, or the first radio bearer is established for communication between a terminal device and the source access network node; or
determine whether to accept remapping of the flow, the session, or the first radio bearer onto the first network slice which is supported by the apparatus; and
a transmitter, configured to send a handover request reply to the source access network node, wherein the handover request reply comprises:
a configuration of the first radio bearer that has been accepted or modified by the apparatus;
a configuration of a second radio bearer newly established by the apparatus;
a mapping relationship between the flow and the first radio bearer;
a mapping relationship between the flow and the second radio bearer;
a mapping relationship between the session and the first radio bearer;
a mapping relationship between the session and the second radio bearer;
a mapping relationship between the flow and network slice indication information of a second network slice, and the second network slice is a new network slice; or
a mapping relationship between the session and the network slice indication information of the second network slice, and the second network slice is a new network slice.

11. The apparatus according to claim 10, wherein:
the transmitter is further configured to:
send a path switch request to a first core network node, wherein the first core network node is an access and mobility management function supported by both the source access network node and a target access network node, and the path switch request comprises indication information of a semi-accepted flow, indication information of a semi-accepted session, or indication information of a semi-accepted radio bearer; and
the receiver is further configured to:
receive a path switch request reply sent by the first core network node, wherein the path switch request reply comprises:
the semi-accepted flow whose path is successfully switched;
the semi-accepted session whose path is successfully switched;
the semi-accepted radio bearer whose path is successfully switched;
the semi-accepted flow whose path has failed to be switched;
the semi-accepted session whose path has failed to be switched;
the semi-accepted radio bearer whose path has failed to be switched;
the network slice indication information of the second network slice;
a context of the semi-accepted flow which has been modified;
a context of the semi-accepted session which has been modified; or
a context of the semi-accepted radio bearer which has been modified.

12. The apparatus according to claim 11, wherein:
the indication information of the semi-accepted flow, the indication information of the semi-accepted session, or the indication information of the semi-accepted radio bearer indicates the semi-accepted flow, the semi-accepted session, or the semi-accepted radio bearer; and
the flow is the semi-accepted flow, the session is the semi-accepted session, or the first radio bearer is the semi-accepted radio bearer when quality of service (QoS) of the flow, the session, or the first radio bearer established between the terminal device and the source access network node is supported by the target access network node, but the target access network node skips supporting a network slice to which the flow, the session, or the first radio bearer belongs or skips determining whether to support a network slice to which the flow, the session, or the first radio bearer belongs.

13. The apparatus according to claim 10, wherein the network slice remapping policy information indicates:
the flow, the session, or the first radio bearer established for communication between the terminal device and the source access network node is remapped from the first network slice onto the second network slice; or
the flow, the session, or the first radio bearer is supported by the terminal device and is remapped from the first network slice onto the second network slice.

14. The apparatus according to claim 10, wherein the network slice indication information of the second network slice identifies the second network slice onto which the flow, the session, or the first radio bearer established for communication between the terminal device and the source access network node is remapped.

15. An apparatus, comprising:
a processor;
a receiver, configured to receive a path switch request sent by a target access network node, wherein the path switch request comprises indication information of a semi-accepted flow, indication information of a semi-accepted session, or indication information of a semi-accepted radio bearer;
a non-transitory computer-readable storage medium storing a program to be executed by the processor, the program including instructions to:
decide whether to remap the semi-accepted flow, the semi-accepted session, or the semi-accepted radio bearer onto a network slice; and
a transmitter, configured to:
send a path switch request reply to the target access network node, wherein the path switch request reply comprises:
the semi-accepted flow whose path is successfully switched;
the semi-accepted session whose path is successfully switched;
the semi-accepted radio bearer whose path is successfully switched;
the semi-accepted session whose path fails to be switched;
the semi-accepted radio bearer whose path fails to be switched;
the semi-accepted flow whose path fails to be switched;
network slice indication information of the network slice, wherein the network slice is a new network slice;
a context of a modified flow;
a context of a modified session; or
a context of a modified radio bearer.

16. The apparatus according to claim 15, wherein:
the indication information of the semi-accepted flow, the indication information of the semi-accepted session, or the indication information of the semi-accepted radio bearer indicates the semi-accepted flow, the semi-accepted session, or the semi-accepted radio bearer; and
a flow is the semi-accepted flow, a session is the semi-accepted session, or a radio bearer is the semi-accepted radio bearer when quality of service (QoS) of the flow, the session, or the radio bearer established between a terminal device and a source access network node is supported by the target access network node, but the target access network node skips supporting a network slice to which the flow, the session, or the radio bearer belongs, or skips determining whether to support a network slice to which the flow, the session, or the radio bearer belongs.

17. The apparatus according to claim 15, wherein deciding whether to remap the semi-accepted flow, the semi-accepted session, or the semi-accepted radio bearer onto the network slice comprises deciding whether to the semi-accepted flow, the semi-accepted session, or the semi-accepted radio bearer onto the network slice, and a manner of mapping the semi-accepted flow, the semi-accepted session, or the semi-accepted radio bearer onto the network slice.

18. The apparatus according to claim 15, wherein the network slice indication information of the new network slice identifies the network slice onto which the semi-accepted flow, the semi-accepted session, or the semi-accepted radio bearer is remapped, wherein the semi-accepted flow, the semi-accepted session, or the semi-accepted radio bearer is established for communication between a terminal device and a source access network node.

* * * * *